(12) United States Patent
Hori et al.

(10) Patent No.: US 11,557,802 B2
(45) Date of Patent: Jan. 17, 2023

(54) VEHICLE BATTERY PACK

(71) Applicant: Nissan Motor Co., Ltd., Yokohama (JP)

(72) Inventors: Yosuke Hori, Kanagawa (JP); Hiroki Saigusa, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 17/271,670

(22) PCT Filed: Sep. 20, 2018

(86) PCT No.: PCT/JP2018/034824
§ 371 (c)(1),
(2) Date: Feb. 26, 2021

(87) PCT Pub. No.: WO2020/059080
PCT Pub. Date: Mar. 26, 2020

(65) Prior Publication Data
US 2021/0320346 A1  Oct. 14, 2021

(51) Int. Cl.
*H01M 10/658* (2014.01)
*H01M 50/209* (2021.01)
*H01M 50/505* (2021.01)
*H01M 50/317* (2021.01)

(52) U.S. Cl.
CPC ....... *H01M 10/658* (2015.04); *H01M 50/209* (2021.01); *H01M 50/317* (2021.01); *H01M 50/505* (2021.01)

(58) Field of Classification Search
CPC ............. H01M 10/658; H01M 50/209; H01M 50/505; H01M 50/317
See application file for complete search history.

(56) References Cited

U.S. PATENT DOCUMENTS

| 2013/0266840 | A1* | 10/2013 | Fujii | H01M 10/60 429/120 |
| 2016/0190662 | A1* | 6/2016 | Kimura | H01M 50/271 429/120 |
| 2016/0222631 | A1* | 8/2016 | Koh | E02F 9/0858 |
| 2017/0005371 | A1* | 1/2017 | Chidester | H01M 10/613 |
| 2019/0140235 | A1* | 5/2019 | Lindstrom | H01M 50/251 |

FOREIGN PATENT DOCUMENTS

| DE | 10 2014 018 752 A1 | 6/2016 | |
| EP | 2 927 990 B1 | 1/2018 | |
| WO | 2010/098067 A1 | 9/2010 | |
| WO | WO-2017181283 A1 * | 10/2017 | .......... H01M 10/425 |

* cited by examiner

*Primary Examiner* — Jimmy Vo
(74) *Attorney, Agent, or Firm* — Global IP Counselors, LLP (57) ABSTRACT

A battery pack has a plurality of battery stacks, a case, and a thermal insulation cover. The case accommodates the plurality of battery stacks. The thermal insulation cover is arranged so as to expose an outer surface of at least one battery stack from among the plurality of battery stacks inside the case, and to cover an outer surface of a battery stack that is adjacent to the exposed battery stack. A difference obtained by subtracting an amount of removed heat from an amount of heat generated during heat generation is greater in the battery stack that is exposed from the thermal insulation cover than in the battery stack that is covered by the thermal insulation cover.

9 Claims, 9 Drawing Sheets

VEHICLE BATTERY PACK

CROSS-REFERENCE TO RELATED APPLICATIONS

This application is a U.S. national stage application of International Application No. PCT/JP2018/034824, filed on Sep. 20, 2018.

BACKGROUND

Technical Field

The present invention relates to a battery pack.

Background Information

There is known in the art a battery pack that has a plurality of battery stacks in which a plurality of battery cells are secured and integrated, and a case for accommodating a plurality of battery stacks.

In one of the battery stacks in the battery pack, heat is sometimes generated by, inter alia, an internal short circuit of a battery cell. The heat generated from the battery stack can be transmitted to adjacent battery stacks, and heat can be generated in the battery stacks one after another. It is therefore important to suppress a chain of exothermic reactions between the battery stacks.

For example, WO 2010/098067 (Patent Document 1) discloses a configuration in which each battery stack is surrounded by a heat-absorbing member, from the standpoint of suppressing a chain of exothermic reactions between battery stacks.

SUMMARY

However, in the configuration described in Patent Document 1, the heat-absorbing member may not be able to adequately absorb the generated heat, and it is possible for heat to accumulate inside the heat-absorbing member and for a chain of exothermic reactions to occur between the battery cells on the inside of the heat-absorbing member. Consequently, to suppress a chain of heat generation in a battery pack as a whole, it is important to consider not only suppression of a chain of exothermic reactions between battery stacks, but also suppression of a chain of exothermic reactions between battery cells.

An object of the present invention is to provide a battery pack in which a chain of exothermic reactions can be suppressed.

The battery pack of the present invention for achieving the abovementioned object has a plurality of battery stacks, a case, and a first thermal insulation member. The case accommodates the plurality of battery stacks. The first thermal insulation member is arranged so as to expose an outer surface of at least one battery stack from among the plurality of battery stacks inside the case, and to cover an outer surface of a battery stack that is adjacent to the exposed battery stack. A difference obtained by subtracting an amount of removed heat from an amount of heat generated during heat generation is greater in the battery stack that is exposed from the first thermal insulation member than in the battery stack that is covered by the first thermal insulation member.

BRIEF DESCRIPTION OF THE DRAWINGS

Referring now to the attached drawings which form a part of this original disclosure.

DETAILED DESCRIPTION OF EMBODIMENTS

An embodiment of the present invention is described below with reference to the attached drawings. The description below does not limit the technical scope or the meaning of terms recited in the claims. Ratios of dimensions in the drawings are sometimes exaggerated for convenience of description, and may vary from actual ratios.

First Embodiment

Figure 1:
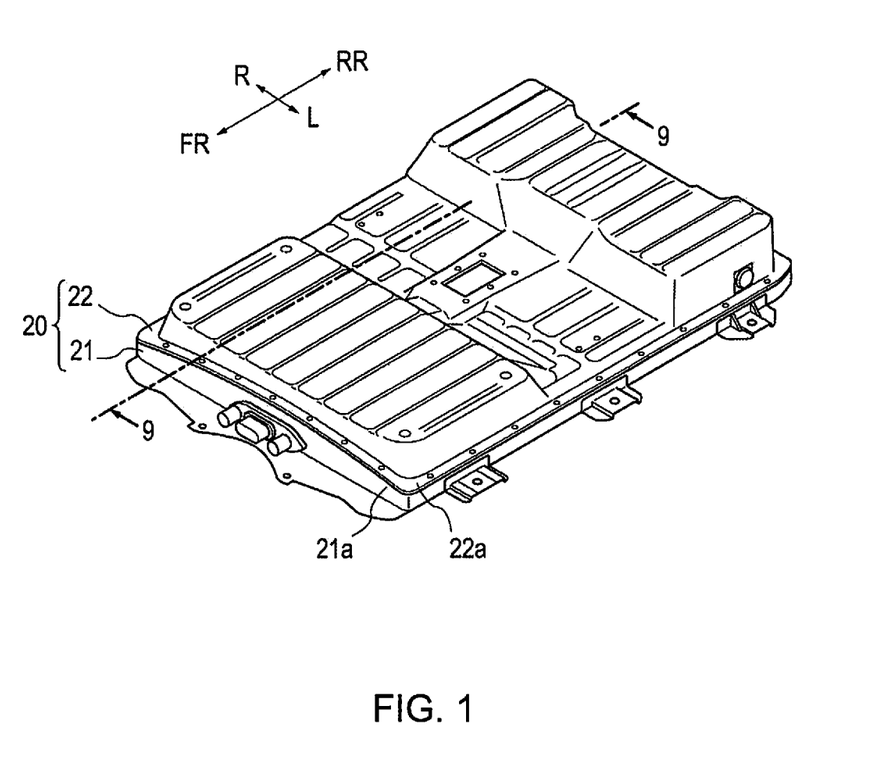
FIG. 1 is a perspective view of a battery pack according to a first embodiment of the present invention.

FIG. 1 is a perspective view of a battery pack 10 according to a first embodiment of the present invention. The battery pack 10 according to the first embodiment can be applied as a power source for an electric automobile or other vehicle, for example. The description of the battery pack 10 according to the first embodiment below is divided into descriptions of a "basic structure," a "high-power-circuit structure," and a "thermal insulation structure."

In the description below, a direction in the battery pack 10 that corresponds to a front side of a vehicle is indicated by an arrow FR in FIG. 1, and is referred to as a front side FR. A direction in the battery pack 10 that corresponds to a rear side of the vehicle is indicated by an arrow RR, and is referred to as a rear side RR. A direction in the battery pack 10 that corresponds to a right side of the vehicle is indicated by an arrow R, and is referred to as a right side R. A direction in the battery pack 10 that corresponds to a left side of the vehicle is indicated by an arrow L, and is referred to as a left side L.

Basic Structure

Figure 2:
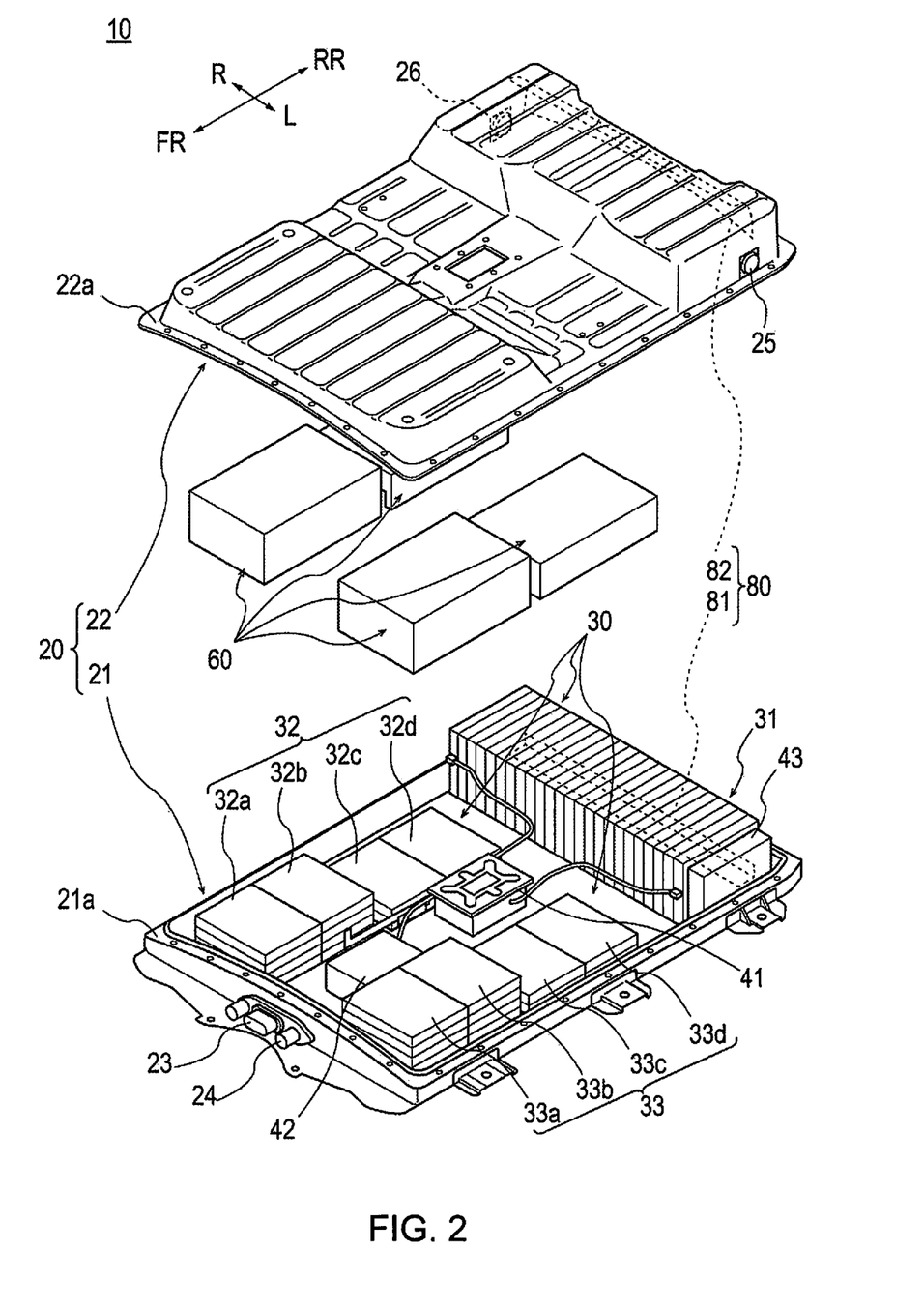
FIG. 2 is an exploded perspective view of the battery pack according to the first embodiment of the present invention, illustrating a state in which a thermal insulation cover is not covering a battery stack.

FIG. 2 is an exploded perspective view of the battery pack 10 according to a first embodiment of the present invention, illustrating a state in which thermal insulation covers 60 are not covering battery stacks 30. In FIG. 2, the thermal insulation covers 60 are illustrated in a simplified manner. As indicated in FIG. 2, the battery pack 10 has a case 20, a plurality of battery stacks 30, an SD switch 41, a junction box 42, and a controller 43. Each of these components is described in detail below.

As illustrated in FIG. 2, the case 20 has a bottomed box-shaped lower case 21 which is open upward, and a bottomed box-shaped upper case 22 which is open downward. As illustrated in FIGS. 1 and 2, an opening edge 21a of the lower case 21 and an opening edge 22a of the upper case 22 are joined via a seal part (not shown). Intrusion of rainwater, dust, etc., into the case 20 from outside the case 20 can thereby be suppressed.

As illustrated in FIG. 2, a charging/discharging connector terminal 23 and an air conditioning connector terminal 24 are provided on a front side FR surface of the lower case 21 in the present embodiment. The air conditioning connector terminal 24 is electrically connected to a PTC heater (not shown) which constitutes an air conditioning system for a vehicle interior.

Gas relief valves 25 and 26 for releasing gas that is generated due to an internal short circuit, etc., of a battery cell C constituting the battery stacks 30 to the outside of the battery pack 10 are provided toward the rear side RR of the upper case 22 in both vehicle-width (left-right direction) side surfaces thereof.

There is no particular limitation as to a material for forming the case 20; iron or another metal material, for example, can be used.

Figure 3:
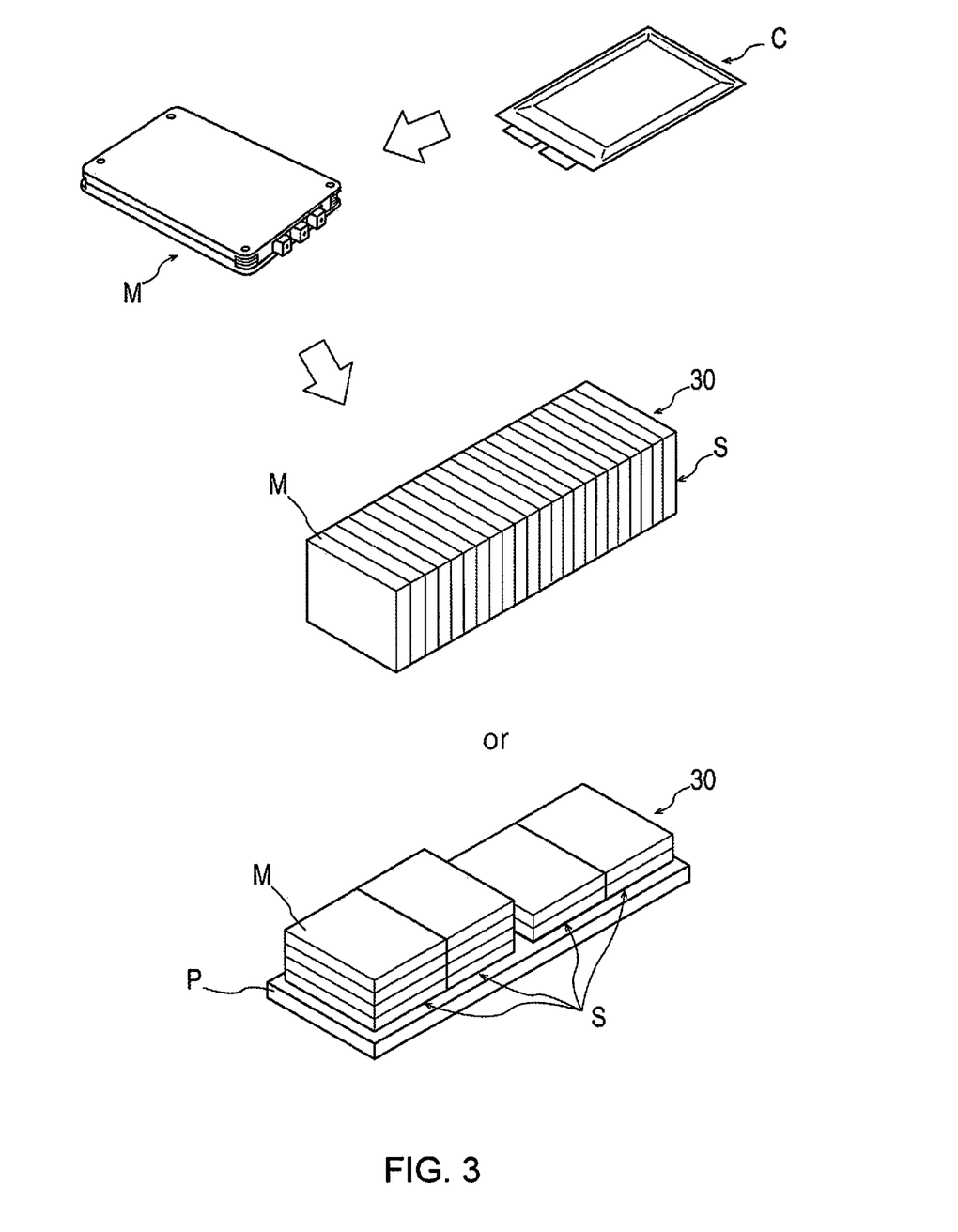
FIG. 3 is a view illustrating an example of a battery cell, a battery module, and a battery stack.

FIG. 3 is a view illustrating an example of a battery cell C, a battery module M, and a battery stack 30. The term "battery stack 30" herein refers to an integrated body obtained by securing and integrating a plurality of battery modules M in a manufacturing step prior to incorporation into the case 20, as illustrated in FIG. 3. The term "battery module M" herein refers to an integrated body obtained by securing and integrating a plurality of battery cells C. The term "battery cell C" herein refers to a power generation element which includes an electrode and an electrolyte layer and which is housed in an exterior body.

There is no particular limitation as to the battery stack 30 as long as the battery stack is an integrated body obtained by securing and integrating a plurality of battery modules M in a manufacturing step prior to incorporation into the case 20. The battery stack 30 may be constituted from, e.g., a single layered body S in which a plurality of battery modules M are secured in a layered state, or from an integrated body in which a plurality of layered bodies S are secured and integrated on a plate P, as illustrated in FIG. 3. There are no particular limitations as to a method for securing the battery modules M and a method for securing the layered bodies S.

The plurality of battery stacks 30 are respectively referred to below as a first battery stack 31, a second battery stack 32, and a third battery stack 33, as illustrated in FIG. 2.

The first battery stack 31 is arranged at the rear side RR of the lower case 21. The first battery stack 31 in the present embodiment is constituted from a single layered body in which a plurality of battery modules M are secured in a state of being layered (stacked) in the vehicle-width direction (left-right direction). In the present embodiment, the first battery stack 31 has 96 battery cells C.

The second battery stack 32 is arranged at the front side FR and right side R of the lower case 21. In the present embodiment, the second battery stack 32 has a first layered body 32a, a second layered body 32b, a third layered body 32c, and a fourth layered body 32d. The first layered body 32a through fourth layered body 32d are arranged from the front side FR to the rear RR. The first layered body 32a through fourth layered body 32d in the present embodiment are secured and integrated in a state of being mounted on a plate P (see FIG. 3).

As indicated in FIG. 2, in the layered bodies 32a to 32d, a plurality of battery modules M are secured in a state of being vertically layered (stacked). In the present embodiment, the second battery stack 32 has 48 battery cells C.

The third battery stack 33 is arranged at the front side FR and left side L of the lower case 21. In the present embodiment, the third battery stack 33 has a first layered body 33a, a second layered body 33b, a third layered body 33c, and a fourth layered body 33d. The first layered body 33a through fourth layered body 33d are arranged from the front side FR to the rear RR. The first layered body 33a through fourth layered body 33d in the present embodiment are secured and integrated in a state of being mounted on the plate P (see FIG. 3).

In the layered bodies 33a to 33d, a plurality of battery modules M are secured in a state of being vertically layered (stacked). In the present embodiment, the third battery stack 33 has 48 battery cells C.

The number of layered bodies constituting the battery stacks 30, the number of battery cells C constituting the battery stacks 30, etc., described above are only examples, and can be changed as appropriate for the desired battery capacity.

The battery cells C in the present embodiment comprise flat lithium ion secondary cells. The battery cells C may be laminated battery cells in which an electrode and an electrolyte layer are layered inside an exterior body, or winding-type battery cells in which an electrode and an electrolyte layer layered inside an exterior body are wound. When an internal short circuit or the like occurs in a laminated battery cell, heat or high-temperature gas blows out from a perimeter in a surface direction intersecting with a layering direction, and when an internal short circuit or the like occurs in a winding-type battery cell, heat or high-temperature gas erupts from a winding axis direction. The direction in which heat or high-temperature gas erupts is thus more limited in a winding-type battery cell than in a laminated battery cell. Therefore, in a winding-type battery cell, heat or high-temperature gas is prone to be locally concentrated, and a chain of exothermic reactions in adjacent battery cells C or battery stacks 30 is prone to occur. The problem addressed by the present invention is therefore even more pronounced in a winding-type battery cell.

As illustrated in FIG. 2, the SD switch 41 is a switch whereby a high-power circuit described hereinafter in the "high-power-circuit structure" can be manually switched ON and OFF. In the present embodiment, the SD switch 41 is arranged between the second battery stack 32 and the third battery stack 33 in the lower case 21. However, there is no particular limitation as to the position of the SD switch 41 in the case 20.

The junction box 42 performs supply/cutoff/distribution of a strong electric current through use of a relay circuit. In the present embodiment, the junction box 42 is arranged in the lower case 21 between the second battery stack 32 and the third battery stack 33 and further toward the front side FR than the SD switch 41. However, there is no particular limitation as to the position of the junction box 42 in the case 20.

The controller 43 is a control device for managing a capacity, temperature, voltage, etc., of the battery stacks 30.

The controller 43 is arranged on a left side L of the first battery stack 31 in the lower case 21. However, there is no particular limitation as to arrangement of the controller 43. The number of controllers 43 provided to the battery pack 10 is one in the present embodiment, but the battery pack 10 can have a plurality of controllers.

High-Power-Circuit Structure

Figure 4:
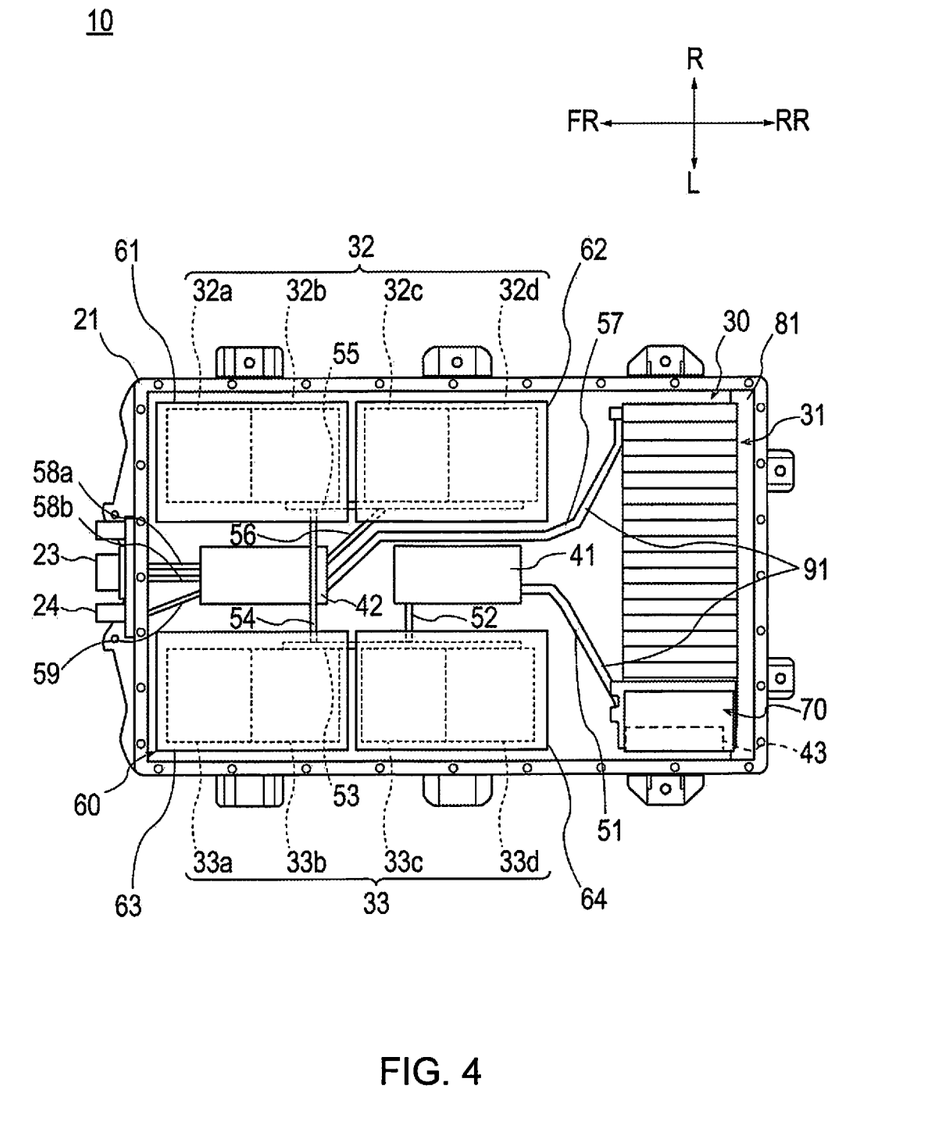
FIG. 4 is a plan view of a state in which an upper case of the battery pack according to a first embodiment of the present invention is removed.

FIG. 4 is a plan view of a state in which the upper case 22 of the battery pack 10 according to the first embodiment of the present invention is removed. As illustrated in FIG. 4, a high-power circuit is formed from a plurality of bus bars 52 to 56, 58a, 58b, and 59 and a pair of high-power harnesses 51 and 57 for electrically connecting the plurality of battery stacks 30, the SD switch 41, and the junction box 42. An example of the high-power circuit is described below.

In the present embodiment, the first battery stack 31 is electrically connected to the SD switch 41 by the high-power harness 51. The SD switch 41 is electrically connected to the third battery stack 33 by the bus bar 52. The first layered body 33a and second layered body 33b, and the third layered body 33c and fourth layered body 33d of the third battery stack 33 are electrically connected by the bus bar 53.

In the present embodiment, the third battery stack 33 is electrically connected to the second battery stack 32 by the bus bar 54. The first layered body 32a and second layered body 32b, and the third layered body 32c and fourth layered body 32d of the second battery stack 32 are electrically connected by the bus bar 55. The second battery stack 32 is electrically connected to the junction box 42 by the bus bar 56. The junction box 42 is electrically connected to the first battery stack 31 by the high-power harness 57.

In the present embodiment, the junction box 42 is electrically connected to the charging/discharging connector terminal 23 by the bus bars 58a and 58b. The junction box 42 is electrically connected to the air conditioning connector terminal 24 by the bus bar 59 in the present embodiment.

The high-power circuit includes, in addition to the above, a controller 43 for measuring a voltage of the battery stacks 30, electrical connections with the battery stacks 30, etc., but these components are not described in detail or shown in the drawings. The high-power circuit described above is only an example, and the relationship of electrical connections between the constituent elements thereof can be changed, as appropriate.

Thermal Insulation Structure

Figure 5:
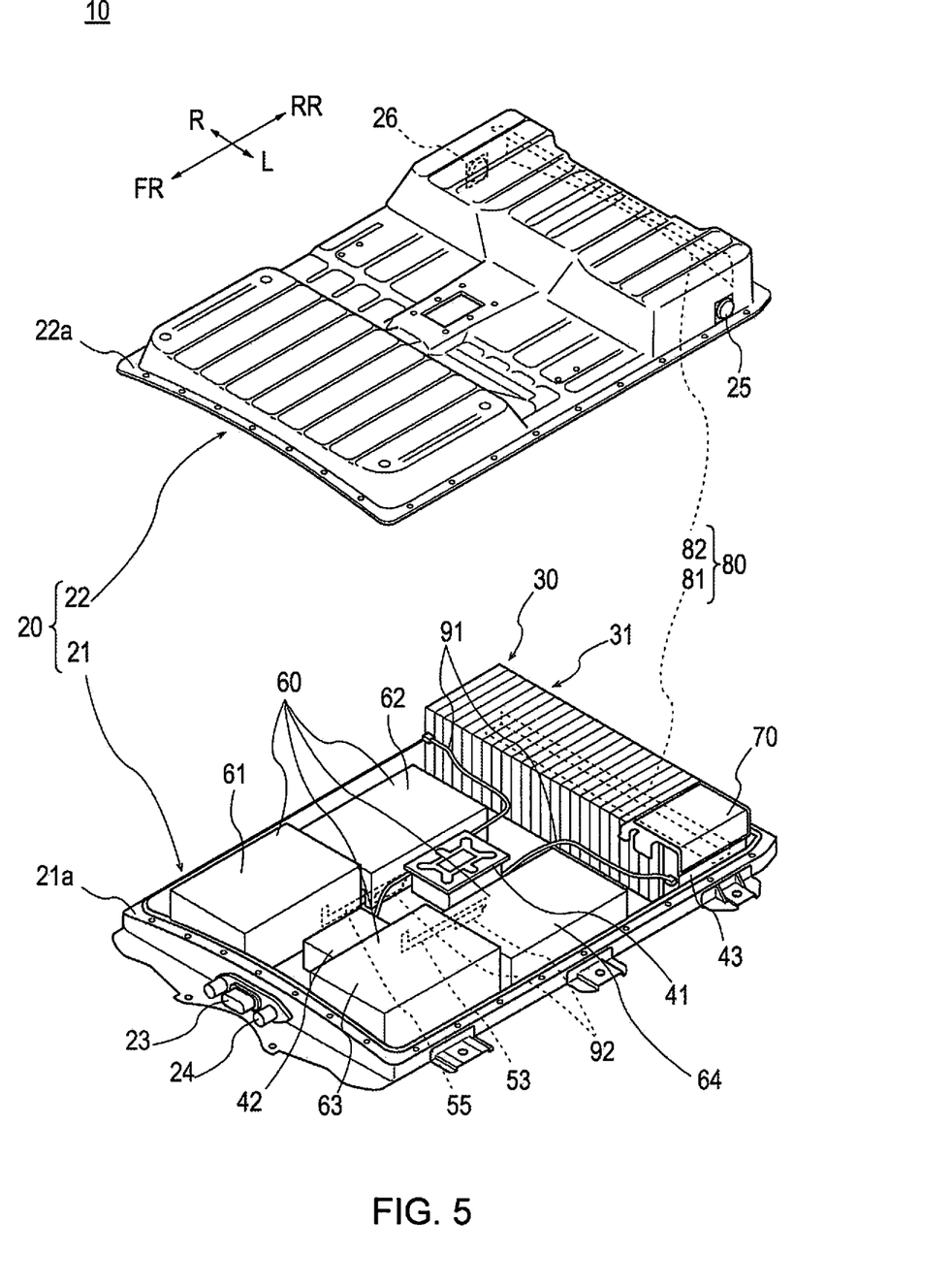
FIG. 5 is an exploded perspective view of the battery pack according to a first embodiment of the present invention, illustrating a state in which the thermal insulation cover is covering the battery stack.

FIG. 5 is an exploded perspective view of the battery pack 10 according to a first embodiment of the present invention, illustrating a state in which a plurality of thermal insulation covers 60 are covering the battery stacks 30. In FIG. 5, the thermal insulation covers 60 are illustrated in a simplified manner. The battery cells C constituting the battery stacks 30 sometimes generate heat as a result of an internal short circuit, etc. High-temperature gas is also sometimes generated from a heated battery cell C. In order to suppress damage to constituent elements of the battery pack 10 due to heat or high-temperature gas generated from an internal short circuit, etc., the battery pack 10 according to the present embodiment has a thermal insulation structure. As illustrated in FIG. 5, the battery pack 10 in the present embodiment has a plurality of the thermal insulation covers 60 (corresponding to a first thermal insulation member), a partial thermal insulation cover 70 (corresponding to a third thermal insulation member), a thermal insulation sheet 80 (corresponding to a second thermal insulation member), a plurality of coating members 91, and a plurality of support members 92. Each of these components is described in detail below.

The thermal insulation covers 60 are arranged so as to expose an outer surface of at least one battery stack (the first battery stack 31 in the present embodiment) from among the plurality of battery stacks 30 inside the case. The plurality of thermal insulation covers 60 are respectively referred to below as a first thermal insulation cover 61, a second thermal insulation cover 62, a third thermal insulation cover 63, and a fourth thermal insulation cover 64.

As illustrated in FIG. 4, the first thermal insulation cover 61 and the second thermal insulation cover 62 are arranged so as to cover an outer surface of the second battery stack 32, which is adjacent to the exposed first battery stack 31. The first thermal insulation cover 61 covers the outer surfaces of the first layered body 32a and the second layered body 32b. The second thermal insulation cover 62 covers the outer surfaces of the third layered body 32c and the fourth layered body 32d. The second battery stack 32 may also be covered by a single thermal insulation cover.

The third thermal insulation cover 63 and the fourth thermal insulation cover 64 are arranged so as to cover an outer surface of the third battery stack 33, which is adjacent to the exposed first battery stack 31. The third thermal insulation cover 63 covers the outer surfaces of the first layered body 33a and the second layered body 33b. The fourth thermal insulation cover 64 covers the outer surfaces of the third layered body 33c and the fourth layered body 33d. The third battery stack 33 may also be covered by a single thermal insulation cover.

The thermal insulation covers 60 are thus arranged so as to cover the outer surfaces of the second battery stack 32 and the third battery stack 33, which are adjacent to the exposed first battery stack 31. The thermal insulation covers 60 can therefore suppress transmission of heat or high-temperature gas generated from the second battery stack 32 and the third battery stack 33 to the adjacent first battery stack 31. The thermal insulation covers 60 can also suppress transmission of heat or high-temperature gas generated from the first battery stack 31 to the adjacent second battery stack 32 and third battery stack 33. Specifically, the thermal insulation covers 60 have both a function of protecting an adjacent battery stack from heating by a covered battery stack, and a function of protecting a covered battery stack 30 from heating by an adjacent battery stack. Consequently, a chain of exothermic reactions between the battery stacks 30 can be suppressed by the thermal insulation covers 60 when heat is generated in any of the plurality of battery stacks 30.

For the "thermal insulation cover 60" to "cover the outer surface of the battery stack 30" means that the outer surface of the battery stack 30, excluding a portion of the outer surface for securing to the case 20, is covered to an extent that a chain reaction of heat generation between the battery stacks 30 can be suppressed. Consequently, openings or the like for inserting bus bars, wiring, and other electrical connection members or the like as described hereinafter may be formed in the thermal insulation covers 60.

The difference obtained by subtracting an amount of removed heat from an amount of heat generated during heat generation is greater in the first battery stack 31, which is exposed from a thermal insulation cover 60, than in the second battery stack 32, which is covered by a thermal insulation cover 60. Here, the "heat removal amount" is the amount of heat transferred from inside the battery stack 30 to the outside. Consequently, the "difference obtained by subtracting the amount of removed heat from the amount of heat generated" corresponds to the amount of heat that is confined within the battery stack 30.

In the present embodiment, the first battery stack 31 is constituted from a larger number of battery cells C than the second battery stack 32 and the third battery stack 33. The amount of heat generated from heating is therefore greater in the first battery stack 31 than in the second battery stack 32 and the third battery stack 33. The first battery stack 31 is also constituted from a single layered body, and compared with the second battery stack 32 or the third battery stack 33, which are constituted from a plurality of layered bodies, the first battery stack 31 has a small exposed area of battery cells C and therefore does not readily dissipate heat. Therefore, when heat is generated in the first battery stack 31, the generated heat is not readily transferred to the outside of the first battery stack 31. The heat removal amount in the first battery stack 31 is therefore small in comparison with the second battery stack 32 and the third battery stack 33. Based on the above, the amount of heat that is confined within the battery stack 30 during heat generation is greater in the first battery stack 31 than in the second battery stack 32 and the third battery stack 33.

There is no particular limitation as to the difference (amount of heat that is confined within the battery stack 30) obtained by subtracting the amount of removed heat from the amount of heat generated; the difference can be evaluated by the following experimental method, for example. All of the battery stacks 30 are arranged in a predetermined position inside the case 20. An internal short circuit is then forced to occur in at least one battery cell C from within the battery stack 30 to be evaluated. The amount of heat that is confined within the battery stack 30, or the amount of heat generated and the amount of removed heat are measured. These amounts of heat can be evaluated using, e.g., a thermometer, a calorimeter, or the like, without particular limitation on the means of evaluation. These amounts of heat can also be evaluated on the basis of, e.g., a maximum value thereof within a certain time, an average value thereof within a certain time, or a median value thereof within a certain time, without particular limitation on the value used for evaluation.

The thermal insulation covers 60 are thus configured so as to expose the first battery stack 31, in which the amount of heat that is confined within the battery stack 30 during heat generation is greater than in the adjacent battery stacks 32 and 33. A large amount of heat is therefore confined within the first battery stack 31, and a chain of exothermic reactions between the battery cells C inside the first battery stack 31 can be suppressed. By thus determining the battery stack 30 to be covered by a thermal insulation cover 60 in accordance with the ease with which heat is confined within the battery stack 30, it is possible to suppress a chain of exothermic reactions in the battery pack 10 as a whole by considering not only suppression of a chain of exothermic reactions between the battery stacks 30, but also suppression of a chain of exothermic reactions between the battery cells C.

In the battery pack 10 according to the present embodiment, because a chain of exothermic reactions between the battery cells C that constitute the first battery stack 31 can be suppressed, the amounts of heat and gas generated can also be reduced. Operation efficiency during manufacturing or maintenance is also excellent in the battery pack 10 according to the present embodiment, in comparison with a battery pack in which all of the battery stacks are covered by thermal insulation covers. In the battery pack 10 according to the present embodiment, weight-number of components thereof can also be reduced relative to a battery pack in which all of the battery stacks are covered by thermal insulation covers.

Figure 6:
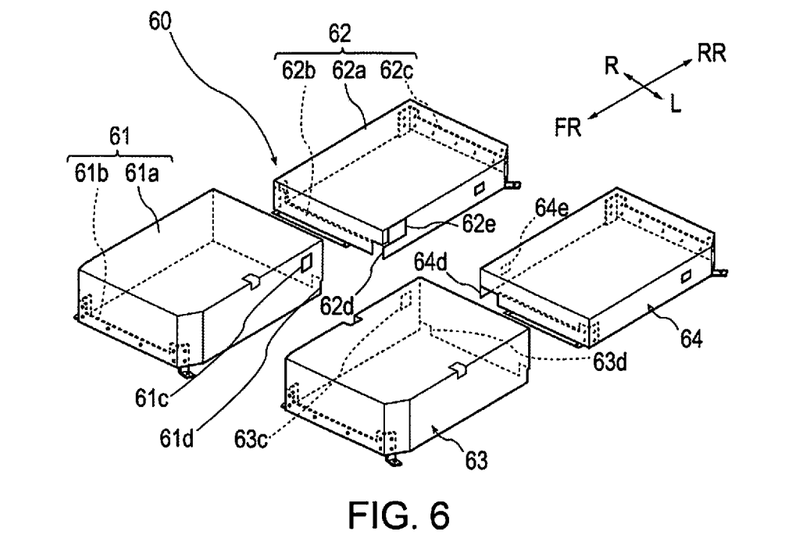
FIG. 6 is a perspective view of a thermal insulation cover of the battery pack according to a first embodiment of the present invention.

FIG. 6 is a perspective view of the thermal insulation covers 60 of the battery pack 10 according to a first embodiment of the present invention. As illustrated in FIG. 6, the first thermal insulation cover 61 in the present embodiment has a thermal insulation cloth 61a and a bracket 61b for securing the thermal insulation cloth 61a to the lower case 21.

The thermal insulation cloth 61a in the present embodiment is formed by joining a plurality of sheets to form a bottomed box-shaped outer shape which is open downward. The thermal insulation cloth 61a may also be constituted from a single sheet. An opening 61c through which the bus bar 54 (see FIG. 4) leads to the outside of the first thermal insulation cover 61 is formed in the thermal insulation cloth 61a. An opening 61d through which the bus bar 55 (see FIG. 4) leads to the outside of the first thermal insulation cover 61 is also formed in the thermal insulation cloth 61a.

In the present embodiment, the bracket 61b is arranged at the front side FR of the thermal insulation cloth 61a. There is no particular limitation as to the position of the bracket 61b.

The second thermal insulation cover 62 in the present embodiment has a thermal insulation cloth 62a and at least two brackets 62b and 62c for securing the thermal insulation cloth 62a to the lower case 21.

The thermal insulation cloth 62a in the present embodiment is formed by joining a plurality of sheets to form a bottomed box-shaped outer shape which is open downward. The thermal insulation cloth 62a may also be constituted from a single sheet. An opening 62d through which the bus bar 55 (see FIG. 4) leads to the outside of the second thermal insulation cover 62 is formed in the thermal insulation cloth 62a. An opening 62e through which the bus bar 56 (see FIG. 4) leads to the outside of the second thermal insulation cover 62 is also formed in the thermal insulation cloth 62a.

As illustrated in FIG. 6, the brackets 62b and 62c in the present embodiment are arranged at the front side FR and the rear side RR, respectively, of the thermal insulation cloth 62a. There is no particular limitation as to the positions of the brackets 62b and 62c. As indicated in FIG. 2, a height of the third layered body 32c and the fourth layered body 32d is less than a height of the first layered body 32a and the second layered body 32b. Therefore, when high-temperature gas is generated and an internal pressure inside the second thermal insulation cover 62 is increased, the second thermal insulation cover 62 does not readily catch on the third layered body 32c and the fourth layered body 32d, and easily comes off. In the present embodiment, however, because the second thermal insulation cover 62 has at least two brackets 62b and 62c, it is possible to maintain a state in which the second thermal insulation cover 62 covers the outer surfaces of the third layered body 32c and the fourth layered body 32d when high-temperature gas is generated and the internal pressure inside the second thermal insulation cover 62 is increased. However, there is no particular limitation as to the number of brackets constituting the second thermal insulation cover 62.

A material for forming the thermal insulation cloths 61a and 62a are not particularly limited insofar as the material can suppress transmission of heat between the inside and outside of the thermal insulation cover 60. The thermal insulation cloths 61a and 62a are also preferably provided with sufficient heat resistance so as not to melt as a result of being hit directly with high-temperature gas, etc. There is no particular limitation as to the material thereof; a composite material of an aramid and glass wool or the like can be cited as an example thereof. A method for joining a plurality of sheets to form the thermal insulation cloths 61a and 62a are preferably a method in which the sheets can be maintained in a joined state when directly hit with high-temperature gas. There is no particular limitation as to the method; examples include sewing using a heat-resistant thread of a material such as a composite material of an aramid and glass wool.

The brackets 61b, 62b and 62c are secured to the lower case 21 by bolts or other fastening members or the like. The brackets 61b, 62b and 62c and the fastening members are preferably provided with sufficient heat resistance so as not to melt as a result of being hit directly with high-temperature gas, etc. There is no particular limitation as to the material thereof; examples thereof include iron and other metal materials.

A structure of the third thermal insulation cover 63 and the fourth thermal insulation cover 64, except for a structure of the bus bars or the openings for wiring, is the same as the structure of the first thermal insulation cover 61 and the second thermal insulation cover 62. Therefore, only the structure of the openings in the third thermal insulation cover 63 and the fourth thermal insulation cover 64 will be described.

An opening 63c through which the bus bar 54 (see FIG. 4) leads to the outside of the third thermal insulation cover 63 is formed in the third thermal insulation cover 63. An opening 63d through which the bus bar 53 (see FIG. 4) leads to the outside of the third thermal insulation cover 63 is also formed in the third thermal insulation cover 63. An opening 64d through which the bus bar 53 (see FIG. 4) leads to the outside of the fourth thermal insulation cover 64 is formed in the fourth thermal insulation cover 64. An opening 64e through which the bus bar 52 (see FIG. 4) leads to the outside of the fourth thermal insulation cover 64 is formed in the fourth thermal insulation cover 64.

There is no particular limitation as to the structure of the thermal insulation covers 60 insofar as the thermal insulation covers 60 can cover the outer surfaces of the battery stacks 30. For example, a thermal insulation cover may be configured such that the thermal insulation cover does not have a bracket, and a thermal insulation cloth is secured directly to the case 20.

As illustrated in FIG. 5, the case 20 has gas relief valve 25 in a position facing the first battery stack 31, which is exposed from the thermal insulation covers 60. Here, "facing" includes not only a mode in which the battery stack 30 and the gas relief valve 25 face each other with no member therebetween, but also a mode in which the battery stack 30 and the gas relief valve 25 face each other via the controller 43 or another member, as illustrated in FIG. 5.

Figure 7:
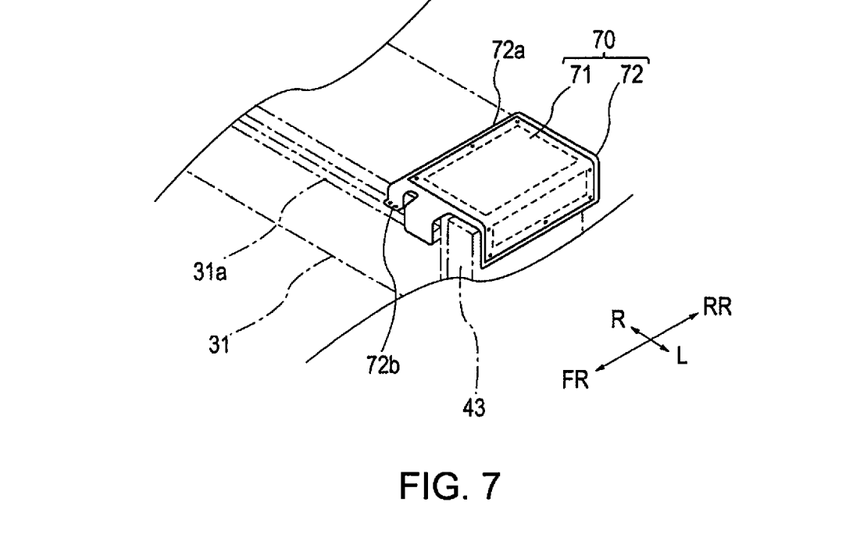
FIG. 7 is a perspective view of a partial thermal insulation cover of the battery pack according to a first embodiment of the present invention.

FIG. 7 is a perspective view of the partial thermal insulation cover 70 of the battery pack 10 according to a first embodiment of the present invention. As illustrated in FIGS. 5 and 7, the partial thermal insulation cover 70 is arranged between the gas relief valve 25 and the first battery stack 31 exposed from the thermal insulation covers 60, and partially covers the outer surface of the first battery stack 31 exposed from the thermal insulation covers 60. The partial thermal insulation cover 70 can therefore inhibit high-temperature gas that is generated from the first battery stack 31 from flowing into the gas relief valve 25 while still hot and damaging equipment outside the case 20.

When the case 20 has a plurality of gas relief valves 25 and 26 as in the present embodiment, a gas relief valve may be configured so that a direct hit with high-temperature gas is prevented by the partial thermal insulation cover 70, in accordance with directionality of the gas. For example, as illustrated in FIG. 5, the partial thermal insulation cover 70 can be arranged between the first battery stack 31 and the left-side L gas relief valve 25 when gas readily spouts toward the left side L from the first battery stack 31. Although this configuration is not shown in the drawings, when there is no difference in how readily gas spouts from the first battery stack 31 in the vehicle width direction (left or right direction), the partial thermal insulation cover 70 can be arranged between the first battery stack 31 and the two gas relief valves 25 and 26. A partial thermal insulation cover may also be arranged between the battery stack that is exposed from the thermal insulation covers and all of the gas relief valves that face the battery stack, regardless of the directionality of gas.

As illustrated in FIG. 7, the partial thermal insulation cover 70 in the present embodiment has a thermal insulation cloth 71 and a bracket 72 for securing the thermal insulation cloth 71 to the first battery stack 31.

In the present embodiment, by bending of a single sheet, the thermal insulation cloth 71 is arranged so as to cover a portion of an upper surface of the first battery stack 31 and a portion of an upper surface and left-side surface of the controller 43. However, the thermal insulation cloth 71 may also be configured so that by joining of two sheets, the thermal insulation cloth 71 is arranged so as to cover a portion of an upper surface of the first battery stack 31 and a portion of an upper surface and left-side surface of the controller 43. The thermal insulation cloth 71 can be formed using the same material used to form the thermal insulation cloth 61a described above.

The bracket 72 has a frame part 72a and a securing part 72b that protrudes from the frame part 72a. There is no particular limitation as to the securing part 72b insofar as the securing part 72b can be secured to the first battery stack 31; the securing part 72b can be secured using a bolt or other fastening member to a channel member 31a or the like provided to the first battery stack 31, for example. The bracket 72 can be formed using the same material used to form the bracket 61b described above.

Figure 8:
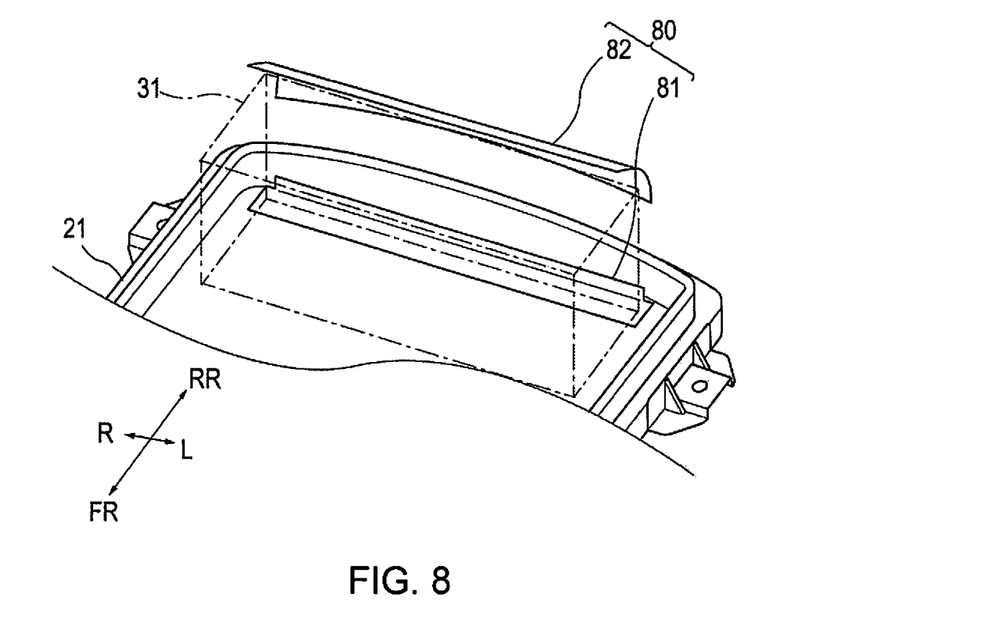
FIG. 8 is a perspective view of a thermal insulation sheet of the battery pack according to a first embodiment of the present invention.
Figure 9:
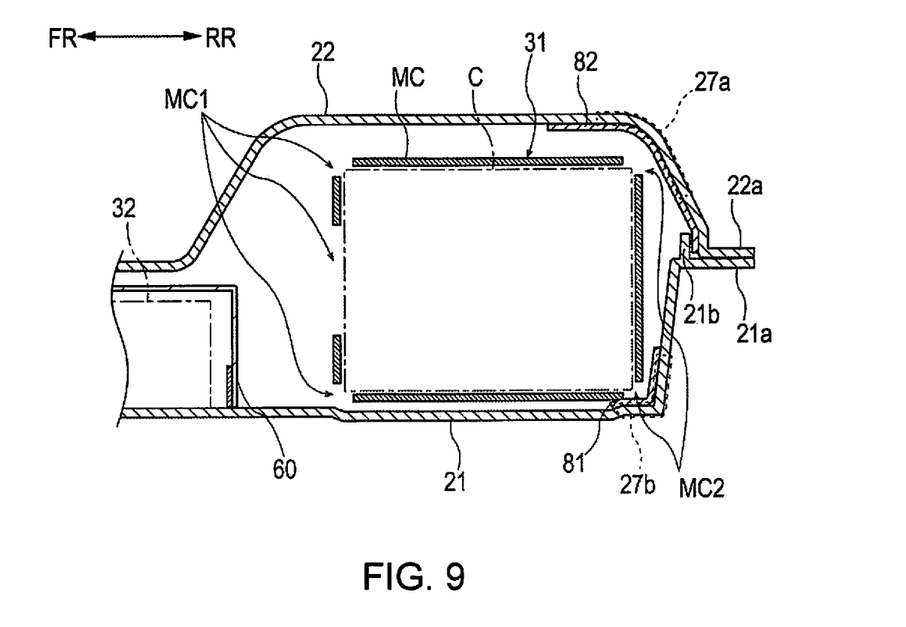
FIG. 9 is a sectional view along line 9-9 of FIG. 1.

FIG. 8 is a perspective view of the thermal insulation sheet 80 attached to an inner surface of the case 20 of the battery pack 10 according to a first embodiment of the present invention. FIG. 8 does not show the upper case 22. FIG. 9 is a sectional view along line 9-9 of FIG. 1. As illustrated in FIGS. 8 and 9, the thermal insulation sheet 80 is attached in regions (referred to below as heat-exposed regions 27a and 27b) of the inner surface of the case 20 that are exposed to heat when the first battery stack 31 exposed from the thermal insulation covers 60 generates heat.

Here, "heat-exposed regions" means regions in the inner surface of the case 20 where heat or gas generated from the first battery stack 31 exposed from the thermal insulation covers 60 directly hits the case 20 while at a sufficiently high temperature to damage the case 20 and equipment on a periphery thereof.

For example, in the present embodiment, regions surrounded by dashed lines at the rear side RR of the case 20 correspond to the heat-exposed regions 27a and 27b, as illustrated in FIG. 9, when a battery cell C constituting the first battery stack 31 generates heat due to a short circuit, etc. The reason for this is described below. When a battery cell C constituting the first battery stack 31 generates heat due to a short circuit, etc., heat or high-temperature gas blows out from a plurality of openings MC1, MC2 in a module case MC that accommodates the battery cell C. Because the openings MC2 on the rear side RR have a smaller open area, are fewer in number, and are less distant from the inner surface of the case 20 than the openings MC1 on the front side FR, the heat or gas directly hits the case 20 in the vicinity of the openings MC2 while still at high temperature. For this reason, the regions of the case 20 in the vicinity of the openings MC2 are the heat-exposed regions 27a and 27b.

The heat-exposed regions 27a and 27b described above are only examples; the heat-exposed regions vary, as appropriate, in accordance with the position or direction of heat or high-temperature gas spouting in the battery stack, a relative distance between the battery stack and the case, and other factors. There are no particular limitations as to, inter alia, the size or position of openings in the module case MC.

As illustrated in FIG. 8, the thermal insulation sheet 80 in the present embodiment has a first thermal insulation sheet 81 attached to an inner surface of the lower case 21, and a second thermal insulation sheet 82 attached to an inner surface of the upper case 22. As illustrated in FIG. 5, the second thermal insulation sheet 82 is attached to the inner surface of the case 20 so as to expose the gas relief valves 25 and 26. The second thermal insulation sheet 82 can therefore prevent the function of the gas relief valves 25 and 26 from being impeded.

The first thermal insulation sheet 81 and the second thermal insulation sheet 82 can be attached to the inner surface of the case 20 by bonding thereof to the inner surface of the case 20 using an adhesive, for example, and there is no particular limitation as to the means of attachment thereof. Even supposing that the adhesive function of the adhesive was to be reduced by heat or high-temperature gas, the first thermal insulation sheet 81 and the second thermal insulation sheet 82 are pressed against the case 20 by the pressure of the gas. The first thermal insulation sheet 81 and the second thermal insulation sheet 82 can therefore be inhibited from falling off the inner surface of the case 20. There is no particular limitation as to the method of attaching the thermal insulation sheet 80 to the inner surface of the case 20.

As illustrated in FIG. 9, with the case 20 closed, the second thermal insulation sheet 82 is arranged so as to be interposed between the inner surface of the upper case 22 and a projection 21b formed on the opening edge 21a of the lower case 21. Through this configuration, the second thermal insulation sheet 82 can be prevented from falling off even supposing that the adhesive function of the adhesive was to be reduced by heat or high-temperature gas.

There is no particular limitation as to a material for forming the first thermal insulation sheet 81 and the second thermal insulation sheet 82, and the same material used to form the thermal insulation cloth 61a described above, for example, can be used.

As illustrated in FIG. 4, the coating members 91 cover outer surfaces of the high-power harnesses 51 and 57. The coating members 91 are provided with insulating properties and heat resistance. The coating members 91 can therefore prevent a ground fault or short circuit in the high-power circuit from occurring as a result of melting of the outer surfaces of the high-power harnesses 51 and 57 by heat or high-temperature gas generated from the battery stack 30.

Here, being "provided with insulating properties" means having sufficient electrical resistance that a ground fault or short circuit does not occur in the high-power circuit even in a high-temperature condition caused by heat or high-temperature gas generated from the battery stack 30. Although not particularly limited, the electrical resistance of the coating members 91 is preferably on the order of $10^{-5}\Omega$ or greater, for example. Being "provided with heat resistance" means not being melted by heat or high-temperature gas that is generated from the battery stack 30. The coating members 91 preferably do not melt even at a temperature of approximately 200 degrees or higher, for example, although there is no particular limitation as to this temperature.

The coating members 91 in the present embodiment are formed by mixing an insulating material and a heat-resistant material that is provided with high heat resistance but has lower insulating properties than the insulating material. There is no particular limitation as to the insulating material; examples thereof include polybutadiene terephthalate (PBT), silicone, polyimide, and other resin materials. There is no particular limitation as to the heat-resistant material; examples thereof include ceramic powder, glass fibers, and the like. The coating members 91 may also be formed by an outer layer that comprises an insulating material and an inner layer that comprises a heat-resistant material, rather than being obtained by mixing an insulating material and a heat-resistant material. The coating members 91 may also be formed from a single material that is provided with both insulating properties and heat resistance.

Figure 10:
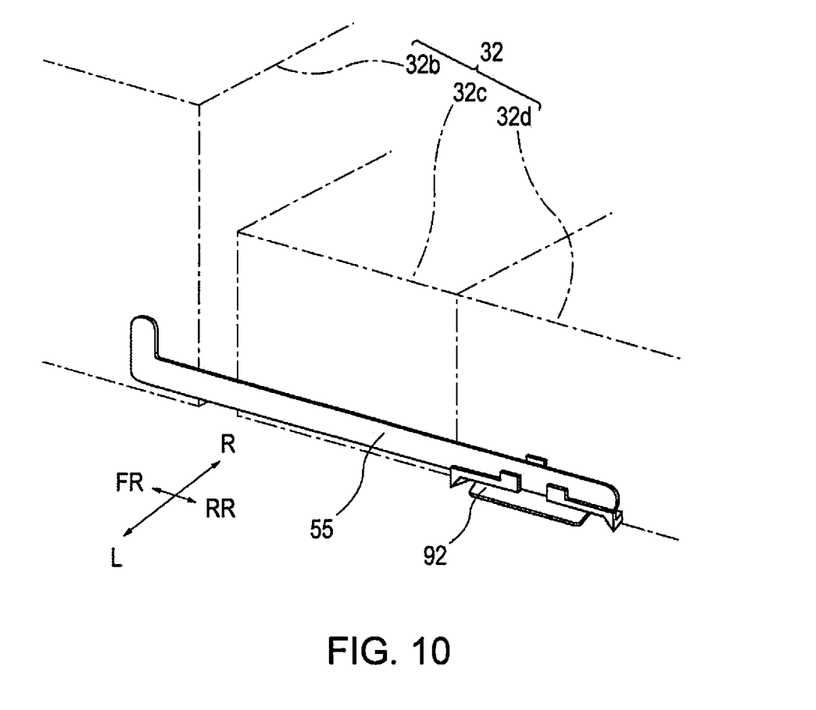
FIG. 10 is a perspective view of a bus bar and a support member for the bus bar of the battery pack according to a first embodiment of the present invention.
Figure 11:
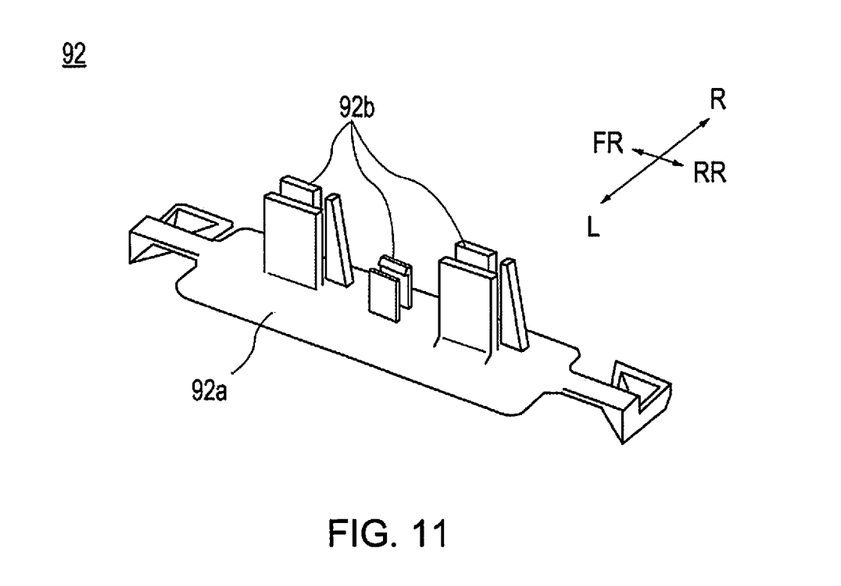
FIG. 11 is a perspective view of the support member in FIG. 10.

FIG. 10 is a perspective view of the bus bar 55 and the support member 92 for the bus bar 55 of the battery pack 10 according to a first embodiment of the present invention. FIG. 11 is a perspective view of the support member 92 in FIG. 10. As illustrated in FIGS. 5 and 10, the support members 92 in the present embodiment support the bus bar 55 that is attached to the second battery stack 32, and the bus bar 53 that is attached to the third battery stack 33. The support members 92 are provided with insulating properties and heat resistance.

The support member 92 for supporting the bus bar 55 attached to the second battery stack 32, and the support member 92 for supporting the bus bar 53 attached to the third battery stack 33 have the same structure. The structure of the support members 92 will therefore be described using the support member 92 for supporting the bus bar 55 attached to the second battery stack 32 as an example.

As illustrated in FIG. 10, the bus bar 55 extends so as to span the plurality of layered bodies 32b, 32c, 32d that constitute the second battery stack 32. The bus bar 55 is therefore longer than the other bus bars in the battery pack 10. The long bus bar 55 may therefore possibly contact the case 20 or another electroconductive member and cause a ground fault in the high-power circuit when the bus bar 55 is flexed by heat or gas generated from the second battery stack 32. However, the support member 92, which is not melted even by exposure to the heat or gas generated from the second battery stack 32, supports the bus bar 55, and can therefore prevent a ground fault from occurring in the high-power circuit due to contact with the case 20 or another electroconductive member.

As illustrated in FIG. 11, the support member 92 in the present embodiment has a mounting surface 92a mounted on the lower case 21, and a holding part 92b which protrudes upward from the mounting surface 92a and which holds the bus bar 55. There is no particular limitation as to the support member 92 in terms of shape and position as long as contact of the bus bar 55 with the case 20 or another electroconductive member can be prevented.

The support member 92 can be formed using the same material used to form the coating members 91 described above.

Operation-Effect

As described above, the battery pack 10 according to the present embodiment has a plurality of battery stacks 30, a case 20, and thermal insulation covers 60. The case 20 accommodates a plurality of battery stacks 30. The thermal insulation covers 60 are arranged so as to expose the outer surface of at least one battery stack 31 from among the plurality of battery stacks 30 inside the case, and to cover the outer surface of the battery stacks 32 and 33 adjacent to the exposed battery stack 31. The difference obtained by subtracting the amount of removed heat from the amount of heat generated during heat generation is greater in the battery stack 31 that is exposed from the thermal insulation covers 60 than in the battery stacks 32 and 33 that are covered by the thermal insulation covers 60.

Through the battery pack 10 described above, the thermal insulation covers 60 can suppress a chain of exothermic reactions between the battery stacks 30 when heat is generated in any of the plurality of battery stacks 30. The battery stack 31, in which, among the battery stacks 30, the amount of heat that is confined within the battery stack when heat is generated is large in comparison with the battery stacks 32 and 33, is also exposed by the thermal insulation covers 60. A large amount of heat can therefore be confined within the battery stack 31, and a chain of exothermic reactions between the battery cells C in the battery stack 31 can be suppressed. By thus determining the battery stack 30 to be covered by a thermal insulation cover 60 in accordance with the ease with which heat is confined within the battery stack 30, it is possible to suppress a chain of exothermic reactions in the battery pack 10 as a whole by considering not only suppression of a chain of exothermic reactions between battery stacks, but also suppression of a chain of exothermic reactions between battery cells C.

Because a chain of exothermic reactions between the battery cells C that constitute the battery stack 31 can be suppressed, the amounts of heat and gas generated can also be reduced. Operation efficiency during manufacturing or maintenance is also excellent in the battery pack 10 described above, in comparison with a battery pack in which all of the battery stacks are covered by thermal insulation covers. The weight/number of components of the battery pack 10 described above can also be reduced relative to a battery pack in which all of the battery stacks are covered by thermal insulation covers.

The battery stack 31 that is exposed from the thermal insulation covers 60 is constituted from a larger number of battery cells C than the battery stacks 32 and 33 that are covered by the thermal insulation covers 60. The larger the number of battery cells C is, the larger is the amount of heat generated. The larger the amount of heat generated is, the larger is the amount of heat that is confined within the battery stack 31 during heat generation. Consequently, by causing the battery stack 31 having a larger number of battery cells C to be exposed from the thermal insulation covers 60, a large amount of heat is confined within the battery stack 31, and a chain of exothermic reactions between the battery cells C can be suppressed. Because a chain of exothermic reactions between the battery cells C can be suppressed, the amounts of heat and gas generated can also be reduced.

The battery pack 10 furthermore has a thermal insulation sheet 80 which is attached in regions 27a and 27b of the inner surface of the case 20 that are exposed to heat when the battery stack 31 exposed from the thermal insulation covers 60 generates heat. It is therefore possible to suppress a condition in which the case 20 or equipment on the periphery thereof is damaged as a result of the case 20 being brought to a high temperature by heat or high-temperature gas generated from the battery stack 31 that is exposed from the thermal insulation covers 60.

The case 20 also has a gas relief valve 25 in a position facing the battery stack 31 that is exposed from the thermal insulation covers 60, and the thermal insulation sheet 80 is attached to the inner surface of the case 20 so as to expose the gas relief valve 25. The thermal insulation sheet 80 can therefore prevent the function of the gas relief valve 25 from being impeded.

The battery pack 10 furthermore has a partial thermal insulation cover 70 which is arranged between the gas relief valve 25 and the battery stack 31 exposed from the thermal insulation covers 60, and which partially covers the outer surface of the battery stack 31 exposed from the thermal insulation covers 60. The partial thermal insulation cover 70 can inhibit gas that is generated during heat generation by the first battery stack 31 from flowing into the gas relief valve 25 while still hot and damaging equipment outside the case 20.

The battery pack 10 furthermore has high-power harnesses 51 and 57, and coating members 91 which are provided with insulation properties and heat resistance and which cover the outer surfaces of the high-power harnesses 51 and 57. The coating members 91 can therefore prevent a ground fault or short circuit in the high-power circuit from occurring as a result of melting of the outer surfaces of the high-power harnesses 51 and 57 by heat or high-temperature gas generated from a battery stack 30.

The battery pack 10 furthermore has bus bars 53 and 55 which are electrically connected to at least one battery stack 32 and 33 from among the plurality of battery stacks 30, and support members 92 which are provided with insulating properties and heat resistance and which support the bus bars 53 and 55. The support member 92 can support the bus bar 55 even when exposed to heat or gas generated by an internal short circuit, etc., in a battery cell C, and can therefore prevent the bus bar 55 from flexing, contacting the case 20 or another electroconductive member, and causing a ground fault in the high-power circuit.

Second Embodiment

Figure 12:
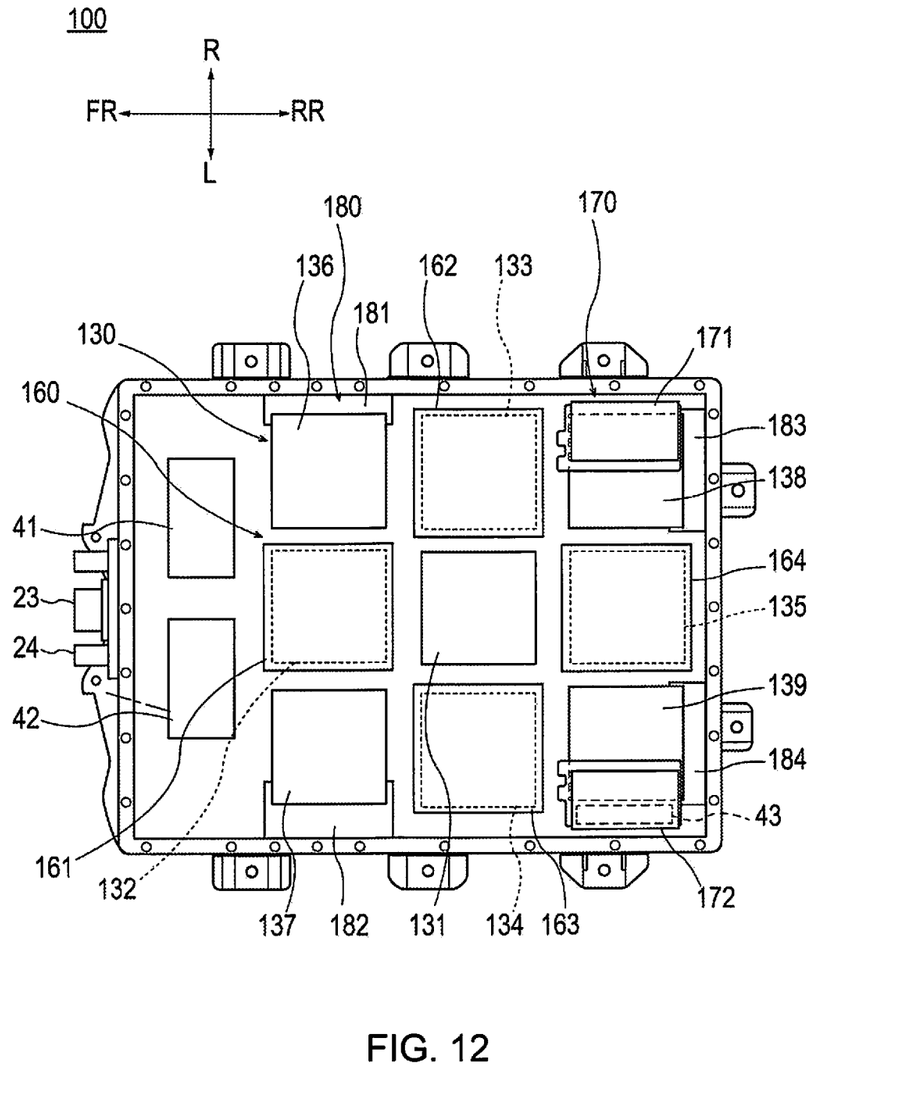
FIG. 12 is a plan view of a state in which an upper case of a battery pack according to a second embodiment of the present invention is removed.

FIG. 12 is a plan view of a state in which an upper case of a battery pack 100 according to a second embodiment of the present invention is removed.

The battery pack 100 according to the second embodiment differs from the battery pack 10 according to the first embodiment with respect to the structure of battery stacks 130, thermal insulation covers 160, partial thermal insulation covers 170, and thermal insulation sheets 180. The battery pack 100 according to the second embodiment described below. In the battery pack 100 according to the second embodiment, the same reference symbols are used to indicate components that are the same as in the battery pack 10 according to the first embodiment, and no description of such components is given.

In the present embodiment, the battery pack 100 has nine battery stacks 130. The battery stacks 130 are each constituted from the same number of battery cells C.

The nine battery stacks 130 are respectively referred to below as a first battery stack 131, a second battery stack 132, a third battery stack 133, a fourth battery stack 134, a fifth battery stack 135, a sixth battery stack 136, a seventh battery stack 137, an eighth battery stack 138, and a ninth battery stack 139.

The first battery stack 131 through ninth battery stack 139 are arranged in a grid so as to form three rows from the front side FR to the rear side RR, and so as to form three rows from the right side R to the left side L.

The first battery stack 131 is arranged in the substantial center of the lower case 21. The second through fifth battery stacks 132 to 135 are arranged so as to surround the first battery stack 131. The sixth battery stack 136 is arranged adjacent to the second battery stack 132 and the third battery stack 133. The seventh battery stack 137 is arranged adjacent to the second battery stack 132 and the fourth battery stack 134. The eighth battery stack 138 is arranged adjacent to the third battery stack 133 and the fifth battery stack 135. The ninth battery stack 139 is arranged adjacent to the fourth battery stack 134 and the fifth battery stack 135.

The first battery stack 131 is adjacent to four battery stacks. Each of the second through fifth battery stacks 132 to 135 is adjacent to three battery stacks.

The battery pack 100 in the present embodiment has four thermal insulation covers 160. The thermal insulation covers 160 are arranged so as to expose an outer surface of at least one battery stack 131 from among the plurality of battery stacks 130 inside the case 20, and so as to cover outer surfaces of battery stacks 132 to 135 that are adjacent to the exposed battery stack 131. The thermal insulation covers 160 in the present embodiment are arranged so as to expose the other battery stacks 136 to 139 that are surrounded by the battery stacks 132 to 135 that are covered by the thermal insulation covers 160.

The four thermal insulation covers 160 are respectively referred to below as a first thermal insulation cover 161, a second thermal insulation cover 162, a third thermal insulation cover 163, and a fourth thermal insulation cover 164.

The first thermal insulation cover 161 is arranged so as to cover the outer surface of the second battery stack 132, which is adjacent to the exposed first battery stack 131. The second thermal insulation cover 162 is arranged so as to cover the outer surface of the third battery stack 133, which is adjacent to the exposed first battery stack 131. The third thermal insulation cover 163 is arranged so as to cover the outer surface of the fourth battery stack 134, which is adjacent to the exposed first battery stack 131. The fourth thermal insulation cover 164 is arranged so as to cover the outer surface of the fifth battery stack 135, which is adjacent to the exposed first battery stack 131.

The thermal insulation covers 160 can therefore suppress transmission of heat or high-temperature gas generated from the second through fifth battery stacks 132 to 135 to the adjacent first battery stack 131 or sixth through ninth battery stacks 136 to 139. The thermal insulation covers 160 can also suppress transmission of heat or high-temperature gas generated from the first battery stack 131 or the sixth through ninth battery stacks 136 to 139 to the second through fifth battery stacks 132 to 135. A chain of exothermic reactions between the battery stacks 130 can thus be suppressed by the thermal insulation covers 160 when heat is generated in any of the plurality of battery stacks 130.

In the present embodiment, the first battery stack 131 exposed from the thermal insulation covers 160 has the greatest number of adjacent battery stacks. The larger the number of adjacent battery stacks 130 is, the smaller is the amount of removed heat during heat generation. The first through ninth battery stacks 131 to 139 have the same number of battery cells C and about the same amounts of generated heat; therefore, the smaller the amount of removed heat is in each battery stack 130, the larger is the amount of heat that is confined within each battery stack 130. Consequently, the first battery stack 131 has the greatest amount of heat that is confined within the battery stack 131 during heat generation.

The thermal insulation covers 160 are thus configured so as to expose the battery stack 131, in which the amount of heat that is confined within the battery stack 130 during heat generation is greatest. A large amount of heat is therefore confined within the battery stack 131, and a chain of exothermic reactions between the battery cells C inside the battery stack 131 can be suppressed.

In the present embodiment, the thermal insulation covers 160 are also arranged so as to expose the other battery stacks 136 to 139 surrounded by the battery stacks 132 to 135 that are covered by the thermal insulation covers 160. A chain of exothermic reactions between battery cells C can therefore be suppressed in the other battery stacks 136 to 139.

The thermal insulation covers 160 have the same structure as the thermal insulation covers 60 according to the first embodiment, and therefore will not be described in detail.

In the present embodiment, the battery pack 100 has two partial thermal insulation covers 170. The two partial thermal insulation covers 170 are respectively referred to below as a first partial thermal insulation cover 171 and a second partial thermal insulation cover 172.

In the battery pack 100 according to the second embodiment, two gas relief valves are provided toward the rear side RR of the upper case in both vehicle-width (left-right direction) side surfaces thereof (see FIG. 5), the same as in the battery pack 10 according to the first embodiment. The battery pack 100 according to the second embodiment is also described using as an example a case in which there is no difference in ease of gas flow to the two gas relief valves.

The first partial thermal insulation cover 171 is arranged between a gas relief valve and the eighth battery stack 138 exposed from the thermal insulation covers 160, and partially covers an outer surface of the eighth battery stack 138. The second partial thermal insulation cover 172 is arranged between a gas relief valve and the ninth battery stack exposed from the thermal insulation covers 160, and partially covers an outer surface of the ninth battery stack 139. The partial thermal insulation covers 170 can therefore inhibit gas that is generated during heat generation by the eighth battery stack 138 and the ninth battery stack 139 from flowing into the gas relief valves while still hot and damaging equipment outside the case 20.

The partial thermal insulation covers 170 have the same structure as the partial thermal insulation cover 70 according to the first embodiment, and therefore will not be described in detail.

In the present embodiment, the battery pack 100 has four thermal insulation sheets 180. The thermal insulation sheets 180 are attached in regions (heat-exposed regions) of the inner surface of the case 20 that are exposed to heat when the battery stacks 136 to 139 exposed from the thermal insulation covers 160 generate heat. The four thermal insulation sheets 180 are respectively referred to below as a first thermal insulation sheet 181, a second thermal insulation sheet 182, a third thermal insulation sheet 183, and a fourth thermal insulation sheet 184.

The first thermal insulation sheet 181 is provided in a heat-exposed region of the inner surface of the case 20 that faces the sixth battery stack 136. The second thermal insulation sheet 182 is provided in a heat-exposed region of the inner surface of the case 20 that faces the seventh battery stack 137. The third thermal insulation sheet 183 is provided in a heat-exposed region of the inner surface of the case 20 that faces the eighth battery stack 138. The fourth thermal insulation sheet 184 is provided in a heat-exposed region of the inner surface of the case 20 that faces the ninth battery stack 139.

There is no particular limitation as to a material for forming the thermal insulation sheets 180; the same material used to form the thermal insulation sheet 80 according to the first embodiment described above, for example, can be used.

As described above, in the battery pack 100 according to the second embodiment, the number of battery stacks 130 adjacent to the battery stack 131 that is exposed from the thermal insulation covers 160 is greater than the number of battery stacks 130 adjacent to the battery stacks 132 to 135 that are covered by the thermal insulation covers 160. The larger the number of adjacent battery stacks 130 is, the smaller is the amount of removed heat that escapes to the outside of the battery stacks 130. The smaller the amount of removed heat is, the larger the amount of heat is that is confined within the battery stacks 130. Consequently, by causing the battery stack 131 that has the largest number of adjacent battery stacks 130 to be exposed from the thermal insulation covers 160, a large amount of heat is confined within the battery stack 131, and a chain of exothermic reactions between the battery cells C can be suppressed. Because a chain of exothermic reactions between the battery cells C can be suppressed, the amounts of heat and gas generated can also be reduced.

Although the description of the high-power circuit in the battery pack 100 has been omitted in the above description of the second embodiment, the battery pack 100 according to the second embodiment is the same as the battery pack 10 according to the first embodiment, the battery pack 100 can have bus bars and high-power harnesses, coating members which are provided with insulating properties and heat resistance to cover the outer surface of the high-power harness, and support members which are provided with insulating properties and heat resistance to support the high-power harnesses.

Battery packs according to embodiments of the present invention and modifications thereof are described above, but the present invention is not limited by the embodiments and modifications described above. Various changes to the present invention are possible on the basis of the features thereof recited in the claims, and such changes are also within the category of the present invention.

For example, the embodiments described above are described as examples of a battery pack mounted in a vehicle, but the present invention is also applicable to a battery pack that is used as a power source for another application.

In the above embodiments, for example, the battery packs had as a thermal insulation structure, thermal insulation covers, a partial thermal insulation cover, a thermal insulation sheet, coating members, and support members. However, the battery pack according to the present invention need only have at least a thermal insulation cover as a thermal insulation structure.

For example, the number of battery stacks provided to the battery pack, the number of battery cells constituting each battery stack, the arrangement of battery stacks, the number of battery stacks adjacent to each battery stack, etc., are not limited to the configurations in the embodiments described above. For example, the number of battery cells in each battery stack and the number of battery stacks adjacent to each battery stack may both differ from the above description.

The invention claimed is:

1. A battery pack comprising:
a plurality of battery stacks;
a case accommodating the plurality of battery packs; and
a first thermal insulation member arranged so as to expose an outer surface of at least one of the battery stacks from among the plurality of battery stacks inside the case, and to cover at least an outer top surface of at least one of the battery stack from among the plurality of battery stacks that is adjacent to the at least one of the battery stacks that is exposed, the first thermal insulation member covering the outer top surface of the at least one of the battery pack along a stacking direction;
a difference obtained by subtracting an amount of removed heat from an amount of heat generated during heat generation being greater in the battery stack that is exposed from the first thermal insulation member than in the battery stack that is covered by the first thermal insulation member.

2. The battery pack according to claim 1, wherein the at least one of the battery stacks that is exposed from the first thermal insulation member has a number of cells that is greater than a number of cells constituting the at least one of the battery stacks that is covered by the first thermal insulation member.

3. The battery pack according to claim 1, wherein a number of the battery stacks adjacent to the at least one of the battery stacks that is exposed from the first thermal insulation member is greater than a number of the battery stacks adjacent to the at least one of the battery stacks that is covered by the first thermal insulation member.

4. The battery pack according to claim 1, further comprising
a second thermal insulation member attached in a region of an inner surface of the case that is exposed to heat when the at least one of the battery stacks exposed from the first thermal insulation member generates heat.

5. The battery pack according to claim 4, wherein the case has a gas relief valve in a position facing the at least one of the battery stacks that is exposed from the first thermal insulation member, and
the second thermal insulation member is attached to the inner surface of the case so as to expose the gas relief valve.

6. The battery pack according to claim 5, further comprising
a third thermal insulation member which is arranged between the gas relief valve and the at least one of the battery stacks exposed from the first thermal insulation member, and which partially covers an outer surface of the at least one of the battery stacks exposed from the first thermal insulation member.

7. The battery pack according to claim 1, further comprising:
a high-power harness adjacent to the at least one of the battery stacks exposed from the first thermal insulation member; and
a coating member which is provided with insulation properties and heat resistance, and which covers an outer surface of the high-power harness.

8. The battery pack according to claim 1, further comprising:
a bus bar electrically connected to at least one of the battery stacks from among the plurality of battery stacks; and
a support member having insulation properties and being heat resistance, and the support member supporting the bus bar.

9. The battery pack according to claim 1, wherein
the first thermal insulation member covering the outer top surface of at least two of the battery packs along the stacking direction.

* * * * *